(12) United States Patent
Miao et al.

(10) Patent No.: US 11,374,634 B2
(45) Date of Patent: Jun. 28, 2022

(54) METHOD AND DEVICE FOR TRANSMITTING INFORMATION

(71) Applicant: Telefonaktiebolaget LM Ericsson (publ), Stockholm (SE)

(72) Inventors: Qingyu Miao, Beijing (CN); Ming Li, Beijing (CN); Huaisong Zhu, Beijing (CN); Jianfeng Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 2 days.

(21) Appl. No.: 15/326,468

(22) PCT Filed: Nov. 30, 2016

(86) PCT No.: PCT/CN2016/107959
§ 371 (c)(1),
(2) Date: Jan. 13, 2017

(87) PCT Pub. No.: WO2017/063614
PCT Pub. Date: Apr. 20, 2017

(65) Prior Publication Data
US 2018/0212658 A1    Jul. 26, 2018

(51) Int. Cl.
*H04B 7/06* (2006.01)
*H04L 25/02* (2006.01)
*H04B 7/0456* (2017.01)
*H04B 7/08* (2006.01)

(52) U.S. Cl.
CPC ......... *H04B 7/0617* (2013.01); *H04B 7/0456* (2013.01); *H04B 7/086* (2013.01); *H04L 25/0202* (2013.01)

(58) Field of Classification Search
CPC .... H04B 7/0617; H04B 7/086; H04B 7/0456; H04L 25/0202
See application file for complete search history.

(56) References Cited

U.S. PATENT DOCUMENTS 5,856,804 A * 1/1999 Turcotte .................... G01S 3/42
                                                        342/371
6,804,312 B1   10/2004 Win et al.
(Continued)

FOREIGN PATENT DOCUMENTS

CN    102959885 A    3/2013
CN    104303477 A    1/2015
(Continued)

OTHER PUBLICATIONS

Extended European Search Report for Application No. 16847580.4, dated Dec. 19, 2017, 7 pages.
(Continued)

*Primary Examiner* — Jean B Corrielus

(57) ABSTRACT

A method and device for transmitting information. The method for transmitting information includes: a digital beam-forming of a receiver is implemented on a received signal; weights of an analog beam-forming of a transmitter are calculated based on weights of the digital beam-forming or channel estimation information of the receiver; and the analog beam-forming of the transmitter is implemented on a signal to be transmitted.

13 Claims, 13 Drawing Sheets

(56) References Cited

U.S. PATENT DOCUMENTS

| | | | | |
|---|---|---|---|---|
| 7,072,692 | B1* | 7/2006 | Katz | H04B 7/0608 455/442 |
| 7,103,119 | B2* | 9/2006 | Matsuoka | H01Q 1/246 375/347 |
| 10,084,521 | B2* | 9/2018 | Ko | H04L 5/0048 |
| 2002/0054621 | A1* | 5/2002 | Kyeong | H04B 7/01 375/147 |
| 2004/0037263 | A1* | 2/2004 | Zeira | H04B 7/0408 370/347 |
| 2005/0078763 | A1* | 4/2005 | Choi | H04B 7/0617 375/267 |
| 2008/0198066 | A1* | 8/2008 | Kang | H04L 5/14 342/174 |
| 2009/0103593 | A1* | 4/2009 | Bergamo | H04B 1/707 375/146 |
| 2009/0141824 | A1* | 6/2009 | Xia | H04B 7/0417 375/267 |
| 2009/0231196 | A1* | 9/2009 | Niu | H01Q 3/26 342/372 |
| 2012/0128099 | A1* | 5/2012 | Morris | H03F 1/3247 375/297 |
| 2012/0326925 | A1* | 12/2012 | Chang | H01Q 3/267 342/357.59 |
| 2013/0229307 | A1* | 9/2013 | Chang | H01Q 25/00 342/372 |
| 2013/0258972 | A1* | 10/2013 | Kim | H04B 7/0617 370/329 |
| 2013/0301454 | A1* | 11/2013 | Seol | H04B 7/043 370/252 |
| 2013/0343235 | A1* | 12/2013 | Khan | H04B 1/56 370/278 |
| 2014/0073337 | A1* | 3/2014 | Hong | H04W 16/28 455/452.1 |
| 2014/0125524 | A1* | 5/2014 | Kim | G01S 3/14 342/417 |
| 2014/0242914 | A1* | 8/2014 | Monroe | H04B 17/21 455/63.4 |
| 2014/0307654 | A1* | 10/2014 | Kim | H04B 7/0617 370/329 |
| 2014/0321563 | A1* | 10/2014 | Park | H04L 25/03898 375/260 |
| 2016/0135090 | A1* | 5/2016 | Krishnamoorthy | H04W 16/28 370/329 |
| 2016/0226564 | A1* | 8/2016 | Taherzadeh Boroujeni | H04B 7/0456 |
| 2016/0241323 | A1* | 8/2016 | Ko | H04B 7/0691 |
| 2016/0269093 | A1 | 9/2016 | Seol et al. | |
| 2016/0295554 | A1* | 10/2016 | Ko | H04W 24/02 |
| 2016/0308597 | A1* | 10/2016 | Kim | H04B 7/0617 |
| 2016/0352407 | A1* | 12/2016 | Ling | H04B 7/0617 |
| 2016/0373938 | A1* | 12/2016 | Chen | H04B 7/0695 |
| 2017/0156108 | A1* | 6/2017 | Kim | H04W 48/16 |
| 2017/0264347 | A1* | 9/2017 | Le-Ngoc | H04B 7/0626 |
| 2017/0272223 | A1* | 9/2017 | Kim | H04L 5/0048 |
| 2018/0020487 | A1* | 1/2018 | Tsai | H04B 7/0404 |
| 2019/0097662 | A1* | 3/2019 | Hornbuckle | H04B 10/00 |

FOREIGN PATENT DOCUMENTS

| | | |
|---|---|---|
| CN | 105429686 A | 3/2016 |
| CN | 105684322 A | 6/2016 |
| CN | 105684323 A | 6/2016 |
| CN | 105814808 A | 7/2016 |
| WO | 2012056865 A1 | 5/2012 |
| WO | 2016078565 A1 | 5/2016 |

OTHER PUBLICATIONS

International Search Report and Written Opinion for Application No. PCT/CN2016/107959, dated Aug. 9, 2017, 11 pages.

"New SID Proposal: Study on New Radio Access Technology," Mar. 7-10, 2016, 8 pages, 3GPP TSG RAN Meeting #71, RP-160671, NTT DOCOMO, Goteborg, Sweden.

Communication under Rule 71(3) EPC for Application No. 16847580.4, dated Sep. 4, 2019, 94 pages.

International Preliminary Report on Patentability for Application No. PCT/CN2016/107959, dated Jun. 13, 2019, 6 pages.

* cited by examiner

METHOD AND DEVICE FOR TRANSMITTING INFORMATION

CROSS-REFERENCE TO RELATED APPLICATIONS

This application is a National stage of International Application No. PCT/CN2016/107959, filed Nov. 30, 2016, which is hereby incorporated by reference.

TECHNICAL FIELD

Embodiments of the present disclosure generally relate to the field of communications, and more particularly, to a method and device for transmitting information.

BACKGROUND

Multi-antenna technologies have an instrumental role in the design of modern radio access technologies (RATs) due to their well-recognized benefits. Specifically, they enable array gain, spatial multiplexing, and spatial diversity, which lead to improved coverage, capacity and robustness. The multi-antenna features have significantly contributed to the success of long term evolution (LTE) and continue driving its evolution to Rel.13 and beyond. Multi-antenna technologies have an even larger relevance in the design and performance of new radio (NR).

Driven by the 5G mobile broadband (MBB) requirement for Gbps peak rates, NR will be deployed at new spectrum larger than 3 GHz, mainly due to the availability of larger bandwidth. However, extending the operation to larger than 3 GHz also poses challenges due to worse radio wave propagation conditions, e.g., the diffraction and propagation loss increase considerably.

One way to overcome link budget loss is to use UE-specific beam-forming at network devices (such as eNBs) for both transmission and reception. While this is already included in LTE, NR will provide higher beam-forming gains due to the large number of antenna elements that arrays will need to maintain the effective antenna area at a reasonable cost at high frequencies. The physical size of the antenna array is expected to have similar (or even smaller at very high frequencies) size since this is important for deployment aspects such as ease of installation, wind load, and visual footprint.

The spatially focused transmission and reception, achieved by UE-specific beam-forming from large arrays, is not only required to use larger bandwidths that are only available at higher frequencies, but also enables spatial multiplexing. Increasing the spectral efficiency, in particular by means of MU-MIMO (Multi-User Multiple Input Multiple Output), is an important design goal for NR to meet the 5G MBB capacity requirements. There are at least two major factors that contribute to making this goal viable.

The first factor is the technology evolution towards large-scale active antenna systems, also known as massive MIMO, in which several tens or even hundreds of antenna elements or small subarrays, can be individually accessed, even directly from the baseband for digital implementations. This gives massive degrees of freedom to signal processing algorithms which greatly enhance the interference reduction capabilities.

Moreover, the use of a very large number of antenna elements raises opportunities for reducing complexity and power consumption, and at least partially overcoming the hardware impairments; thus, enabling use of components with relaxed requirements.

The second factor that enables the goal of meeting the MBB capacity is that since most of the new spectrum is expected to be unpaired, NR will be using TDD (Time Division Duplex). High quality CSI (Channel State Information) is the key prerequisite to further improve the performance potential of massive MIMO signal processing capabilities.

TDD facilitates the acquisition of explicit CSI, by making it possible to achieve the strongest (so-called coherent) form of reciprocity, especially for large arrays for which feedback-based schemes may have significant signaling overhead. Explicit CSI makes it possible to design flexible precoders that exploit angular spread and suppress interference. In order to rely on reciprocity for CSI acquisition, special requirements need to be imposed to NR uplink signaling and hardware design.

Furthermore, NR should not be tied only to fully-digital implementations; for several use cases, e.g., indoor deployments operating at mmW frequencies, hybrid analog/digital architectures offer attractive cost-performance trade-offs.

It is important also to note that NR multi-antenna technologies do not only limit to the network device (such as an eNB). Small wavelengths make it viable even for handheld user equipment (UE) to be equipped with one or more arrays with many active elements, possibly with distributed power amplifiers.

Then, uplink (UL) beam-forming becomes a highly relevant feature, e.g., to improve uplink coverage of power-limited UEs. Moreover, in several 5G use cases (e.g., self-backhauling, D2D (Device to Device), V2X (Vehicle to anything), fixed wireless) the classical downlink/uplink notion of cellular access is not as relevant, as the two sides of the link may have similar multi-antenna capabilities.

On the other hand, weighting may be performed on a receiving signal or a transmitting signal in order to realize the beam-forming; Depending on beam-forming architecture, the weighting can be done either in the digital domain or the analog domain. The beam-forming includes both transmitter beam-forming and receiver beam-forming, so the weights of beam-forming can be transmitting weights or receiving weights.

If taking receive (Rx) side for example, for the digital domain weight, antenna-specific analog digital converter (ADC) is used, yet for the analog domain weight, the weighting is implemented via phase shifter at analog domain before ADC, and therefore antenna-specific ADC can be avoided.

There are four types of weights: digital transmitter beam-forming weight, $W_{t,D}$; digital receiver beam-forming weight, $W_{r,D}$; analog transmitter beam-forming weight, $W_{t,A}$; analog receiver beam-forming weight, $W_{r,A}$.

In current 3GPP (the $3^{rd}$ generation partner project), an agreement was made to study on massive MIMO analog/digital/hybrid beam-forming for NR.

This section introduces aspects that may facilitate a better understanding of the disclosure. Accordingly, the statements of this section are to be read in this light and are not to be understood as admissions about what is in the prior art or what is not in the prior art.

SUMMARY

The inventor found that the digital beam-forming has great performance benefits by utilizing coherent reciprocity.

Each channel of each antenna can be estimated. Also, there are no fundamental limitations on uplink (UL) reception. There is no need of beam sweeping to receive the signal whose direction is not known.

However, the digital beam-forming solution is complex in general. Complexity means chip area/cost and power consumption, and in most cases these factors go hand in hand. The level of complexity in the digital domain is high, due to the large number of involved analog/digital converters (ADC and/or DAC) and IFFTs/FFTs (Inverse Fast Fourier Transforms/Fast Fourier Transforms).

In order to solve at least part of the above problems, methods, apparatus, devices and computer programs are provided in the present disclosure. It can be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Each of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for transmitting information. For a transmitter, the analog beam-forming is implemented, while for a receiver, the digital beam-forming is implemented.

In a first aspect, a method implemented at a device is provided. Beam-forming is to be used in the device and the device includes a receiver and a transmitter. The method includes: a digital beam-forming of the receiver is implemented on a received signal; weights of an analog beam-forming of the transmitter are calculated based on weights of the digital beam-forming or channel estimation information of the receiver; and the analog beam-forming of the transmitter is implemented on a signal to be transmitted.

In one embodiment, channel reciprocity is used to calculate the weights of an analog beam-forming of the transmitter based on weights of the digital beam-forming or channel estimation information of the receiver.

In one embodiment, the method further includes channel estimation on each of receiving channels of the receiver is performed based on the received signal; the weights of the digital beam-forming of the receiver are calculated based on the channel estimation.

In one embodiment, the method further includes channel estimation on each of receiving channels of the receiver is performed based on a reference signal; and antennas of the receiver are calibrated according to a result of the channel estimation.

In one embodiment, the method further includes channel estimation on each of transmitting channels of the transmitter is performed based on a reference signal; and antennas of the transmitter are calibrated according to a result of the channel estimation.

In one embodiment, the method further includes: a signaling is transmitted to another device for indicating that the digital beam-forming is used in the receiver and the analog beam-forming is used in the transmitter.

In one embodiment, Kr digital chains are in the receiver and Kt digital chains are in the transmitter; where Kt is less than Kr.

In a second aspect, an apparatus for transmitting information is provided, in which beam-forming is to be used. The apparatus includes: a reception beam-forming unit configured to implement a digital beam-forming of a receiver on a received signal; a transmission weight calculating unit configured to calculate weights of an analog beam-forming of a transmitter based on weights of the digital beam-forming or channel estimation information of the receiver; and a transmission beam-forming unit configured to implement the analog beam-forming of the transmitter on a signal to be transmitted.

In one embodiment, the transmission weight calculating unit is configured to calculate the weights of an analog beam-forming of the transmitter based on weights of the digital beam-forming or channel estimation information of the receiver by using channel reciprocity.

In one embodiment, the apparatus further includes: a channel estimating unit configured to perform channel estimation on each of receiving channels of the receiver based on the received signal; a reception weight calculating unit configured to calculate the weights of the digital beam-forming of the receiver based on the channel estimation.

In one embodiment, the channel estimating unit is further configured to perform channel estimation on each of receiving channels of the receiver based on a reference signal; and the apparatus further includes: a reception calibrating unit configured to calibrate antennas of the receiver according to a result of the channel estimation.

In one embodiment, the channel estimating unit is further configured to perform channel estimation on each of transmitting channels of the transmitter based on a reference signal; and the apparatus further includes: a transmission calibrating unit configured to calibrate antennas of the transmitter according to a result of the channel estimation.

In one embodiment, the apparatus further includes: a signaling transmitting unit configured to transmit a signaling to another device for indicating that the digital beam-forming is used in receiver and the analog beam-forming is used in transmitter.

In one embodiment, Kr digital chains are in the receiver and Kt digital chains are in the transmitter; where Kt is less than Kr.

In a third aspect, a device is provided. Beam-forming is to be used in the device and the device includes a receiver and a transmitter, and the device further includes: a reception beam-forming unit configured to implement a digital beam-forming of the receiver on a received signal; a transmission weight calculating unit configured to calculate weights of an analog beam-forming of the transmitter based on weights of the digital beam-forming or channel estimation information of the receiver; and a transmission beam-forming unit configured to implement the analog beam-forming of the transmitter on a signal to be transmitted.

In a fourth aspect, a device is provided. The device includes: a processor and a memory. The memory contains instructions executable by the processor, whereby the processor being adapted to cause the device to perform the method according to the first aspect of the present disclosure.

According to various embodiments of the present disclosure, the digital beam-forming is used for receiving and there is no need to know which direction the transmission comes from; the analog beam-forming is used for transmitting and the transmitter beam weights can be derived from the receiving channels. Therefore, not only no beam sweeping is needed, but also complexity of the transmitter is lowered and flexible beam can be used.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
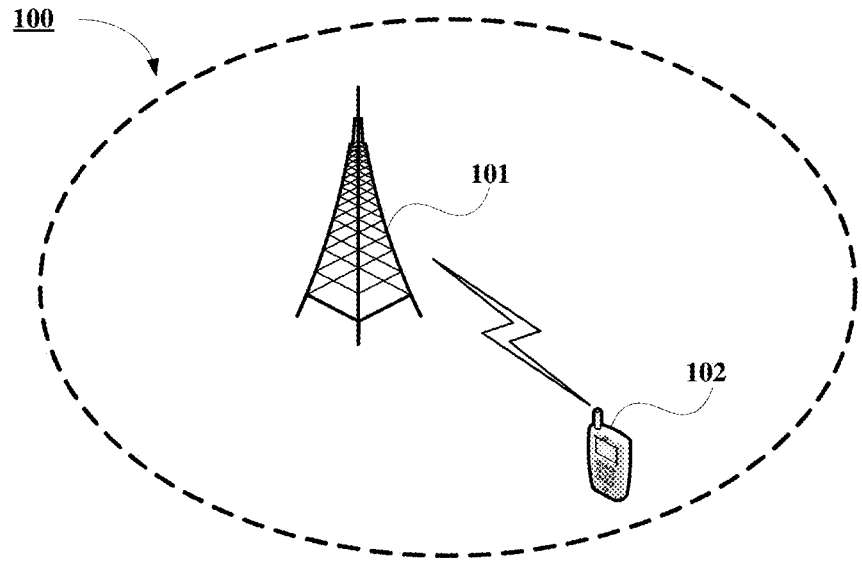
FIG. 1 shows a schematic diagram 100 of a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

Yet further examples of network device include multistandard radio (MSR) radio equipment such as MSR B s, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IoT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

In this disclosure, a device can be a network or a terminal device. That is, a method for transmitting information of the disclosure can be implemented at the network device in which beam-forming is used, or the method for transmitting information of the disclosure can also be implemented at the terminal device in which beam-forming is used.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

The term "weighting" or "weights", when used in this disclosure, refers to LTE/LTE-A specification, such as Rel.12. For example, weights are some parameters (or values, coefficients, and so on) of the weighting.

Now some exemplary embodiments of the present disclosure will be described below with reference to the figures.

FIG. 1 shows a schematic diagram 100 of a wireless communication network. As shown in FIG. 1, it illustrates a network device 101 and a terminal device 102 in the wireless communication network. In the example of FIG. 1, the network device 101 provides service to the terminal device 102. The traffic between the network device 101 and the terminal device 102 may be URLLC (ultra-reliable and low latency communication) traffic, eMBB (enhanced mobile broadband) traffic, mMTC (massive machine type communication) traffic, and so on.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Next, beam-forming will be illustrated.
Digital Beam-Forming

Ideally, signals from/to all antenna elements should be digitally processed in a baseband domain so that all degrees of freedom are available ("full-dimension" digital beam-forming).

Figure 2:
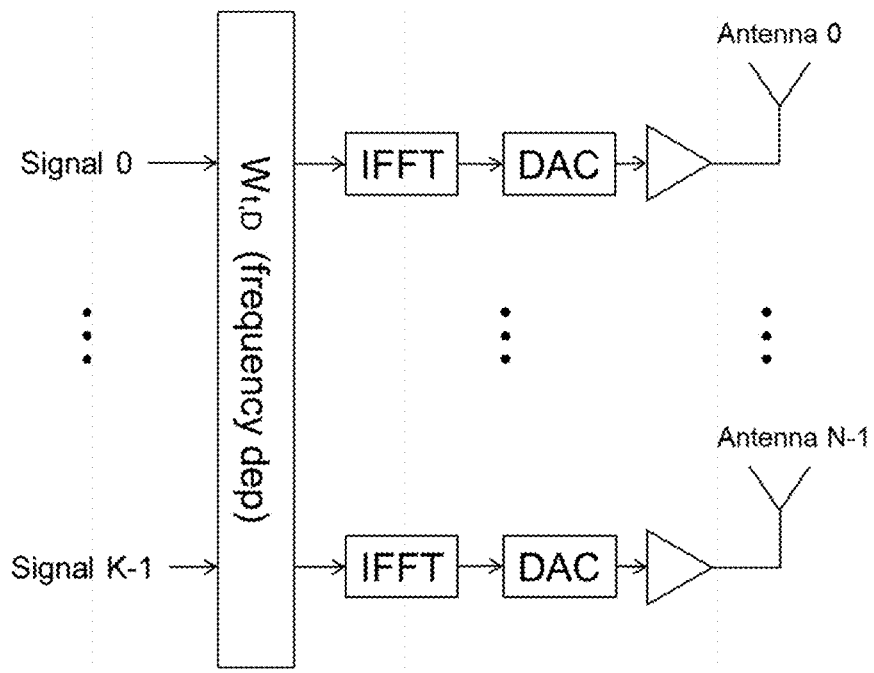
FIG. 2 is a diagram which shows an example of digital beam-forming in transmitter side.
Figure 3:
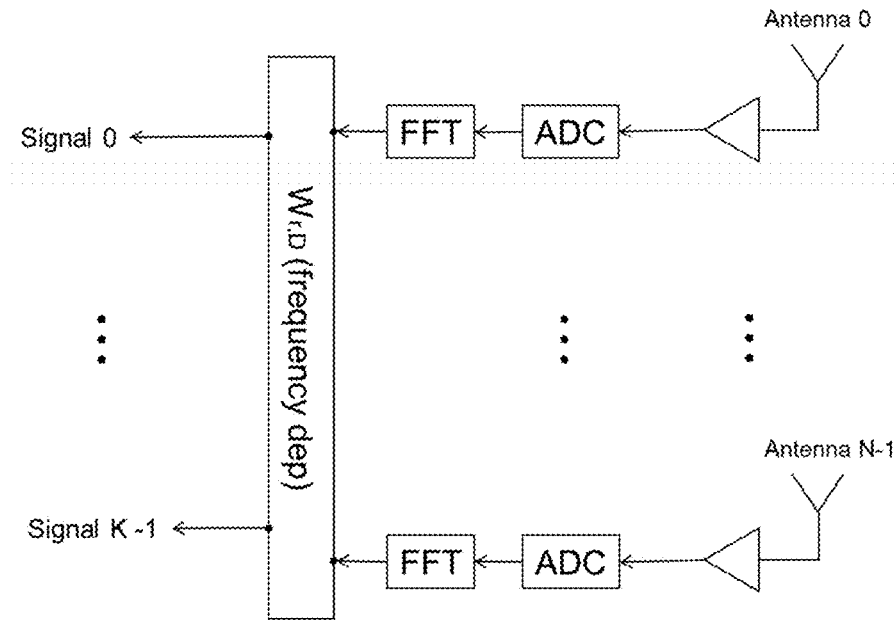
FIG. 3 is a diagram which shows an example of digital beam-forming in receiver side.

FIG. 2 is a diagram which shows an example of digital beam-forming at transmitter side, FIG. 3 is a diagram which shows an example of digital beam-forming at receiver side. As shown in FIG. 2 and FIG. 3, there are multiple digital chains (for example, an FFT and an ADC may be included in each digital chain for a receiver, an IFFT and a DAC may be included in each digital chain for a transmitter; and each digital chain may be corresponding to a channel, but it is not limited thereto) at the transmitter and receiver respectively. This gives total flexibility in the spatial and frequency domains for post-processing signals at reception and for precoding at transmission; thus, enabling full potential of massive MIMO features such as frequency-selective precoding and MU-MIMO.

In a digital beam-forming solution, there is baseband access to each individual antenna element. In case when an antenna element has a wide beam width, energy or signal may be transmitted to a direction where there are no users, so that one antenna element can be replaced with a subarray with a narrower beam width and the transmission direction can be steered from baseband.

In FIG. 2 and FIG. 3, there are K signals that each covers the whole bandwidth or part of the bandwidth, the beam-forming architecture puts no limitations on this. K should be interpreted as the maximum number of such signals that can be transmitted simultaneously; at any time, K can be smaller than or equal to N. To form beams, the signals pass through a digital precoder. After the precoder, there are N (correlated) signals. In principle, any precoder can be used, such as DFT (Discrete Fourier Transform), zero-forcing, etc.

For the transmitting beam-forming, as shown in FIG. 2, each of the N signals passes through a separate digital chain including an IFFT and a DAC. The resulting analog signal is then amplified, before it is transmitted over the antenna. Note that several parts have been omitted for simplicity, e.g., the mixer which transforms the signal to radio frequency (RF).

For the receiving beam-forming as shown in FIG. 3, the signals received at the antennas are amplified, and converted into digital form. They are then mapped to the frequency domain, by passing through an FFT. After that, the frequency domain signals pass through a digital spatial decoder, which produces K signals that can be individually decoded. Note that any digital decoder can be used, such as DFT, MMSE (Minimum Mean Squared Error), zero-forcing. Again, several parts have been omitted for simplicity. For example, the mixer is not shown, nor is the channel estimation.

Analog Beam-Forming

Analog beam-forming is done in the analog (time) domain, i.e. after the DAC, for precoding. Analog beam-forming is therefore frequency independent, i.e. applies to the entire spectrum.

Analog beam-forming implementations usually rely on predefined grid of beams that can be selected to transmit/receive data streams. Each beam corresponds to a phase-shifting precoder, which avoids having to control the amplitude as this would require additional PA (Power Amplifier). Beams can be set to form sectors, hotspots, or some spatial separations to allow user multiplexing. Antenna arrays spanning over 2 dimensions can perform both vertical and horizontal beam shaping.

Figure 4:
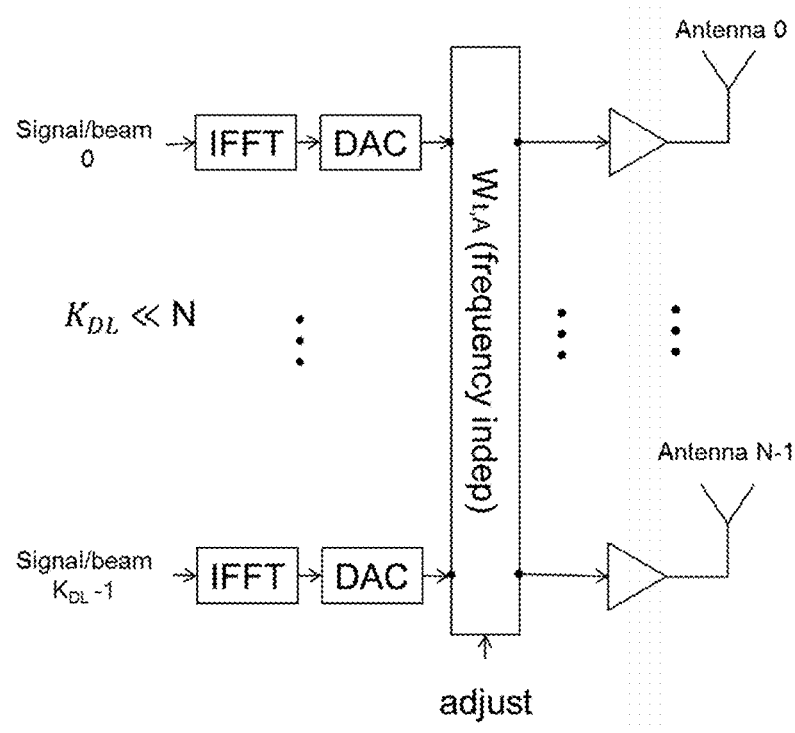
FIG. 4 is a diagram which shows an example of analog beam-forming in transmitter side.
Figure 5:
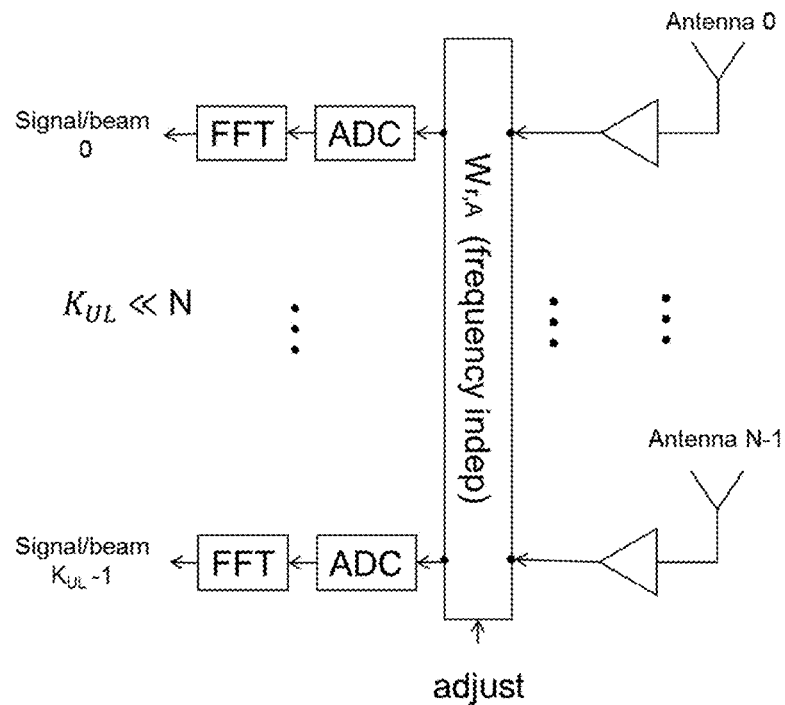
FIG. 5 is a diagram which shows an example of analog beam-forming in receiver side.

FIG. 4 is a diagram which shows an example of analog beam-forming at transmitter side, FIG. 5 is a diagram which shows an example of analog beam-forming at receiver side. Here, the beams are formed using analog components, mainly phase shifters and adders. As shown in FIG. 4 and FIG. 5, there are $K_{DL}$ digital chains in the transmitter and receiver respectively. It should be noted that $K_{DL}$ may be much less than N ($K_{DL} \ll N$).

Unlike the digital beam-forming, these signals are typically not full bandwidth. For instance, if a mobility reference signal need to be transmitted, it has to be assigned to one of the signals, even though it uses only a few subcarriers. These signals are converted to the analog domain and converted into analog form. The analog signals then pass through an analog precoder to produce beams, before they are amplified and transmitted over the antenna elements.

In the analog precoding structure, phase shifters, adders and switches are used. With only phase shifters and adders, there are limitations in what beam shapes may be created. Actually, to produce the beam steering, frequency-independent delay components are preferred to configure with phase shifters. Note that several signals can be transmitted and received at the same time.

There is another way for the analog beam-forming.

Figure 6:
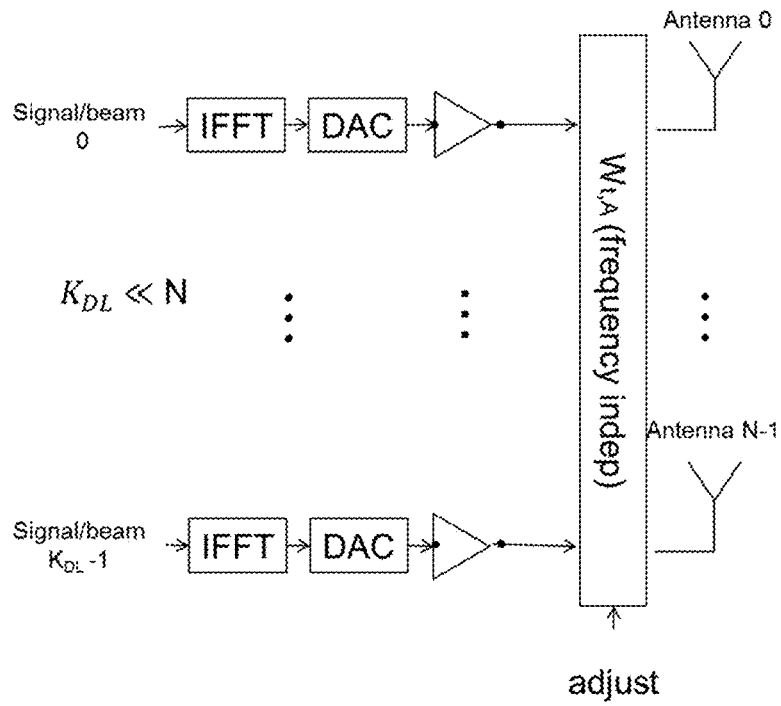
FIG. 6 is a diagram which shows another example of analog beam-forming in transmitter side.
Figure 7:
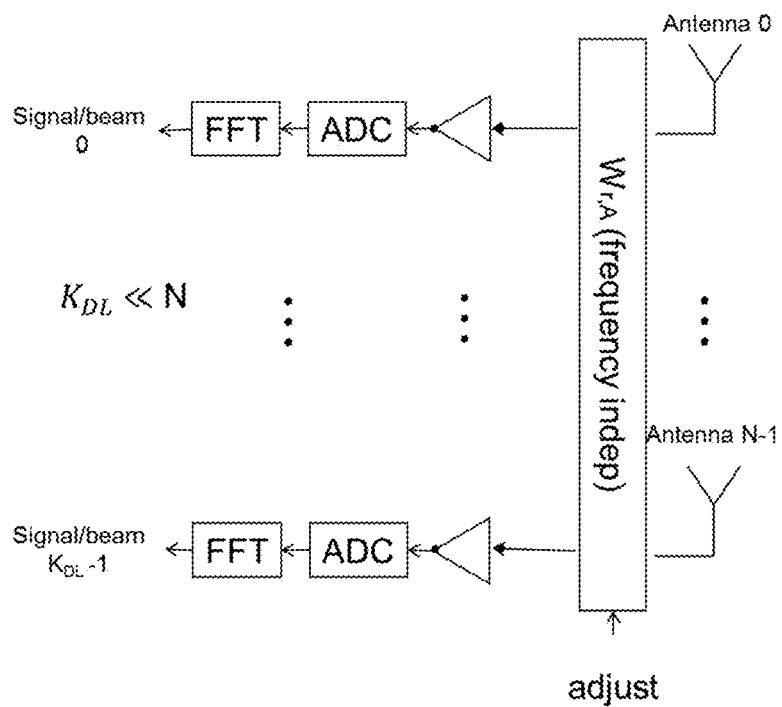
FIG. 7 is a diagram which shows another example of analog beam-forming in receiver side.

FIG. 6 is a diagram which shows another example of analog beam-forming at transmitter side, FIG. 7 is a diagram which shows another example of analog beam-forming at receiver side. The weights can be adjusted after the power amplifier in the transmitter beam-forming as shown in FIG. 6, for example, the adjusted weight for the transmitter is $W_{t,A}$ and frequency independent. Or the weights can be adjusted before the LNA (Low Noise Amplifier) in the receiver beam-forming as shown in FIG. 7, for example, the adjusted weight for the receiver is $W_{r,A}$ and frequency independent.

Hybrid Beam-Forming

Figure 8:
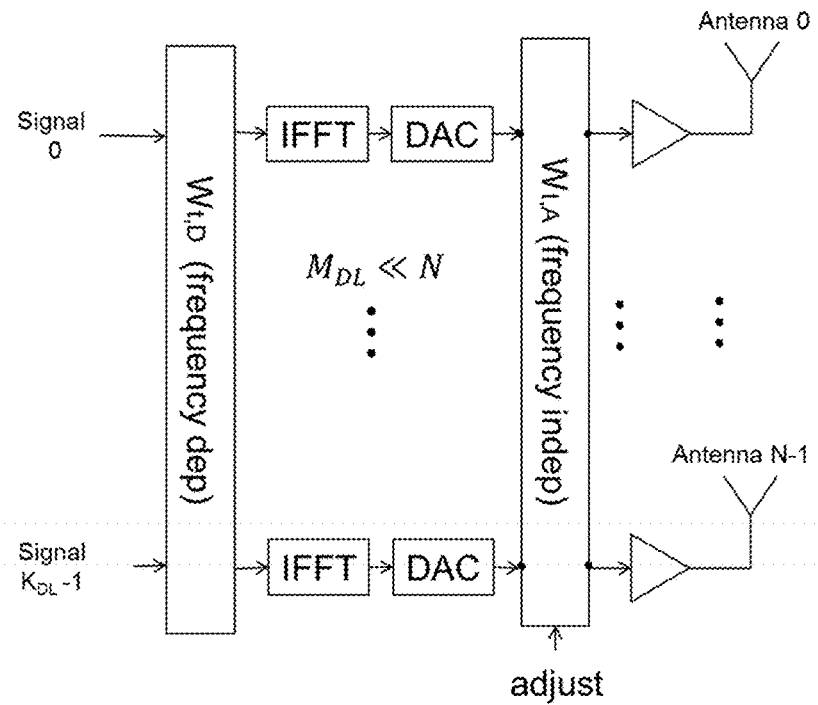
FIG. 8 is a diagram which shows an example of hybrid beam-forming in transmitter side.
Figure 9:
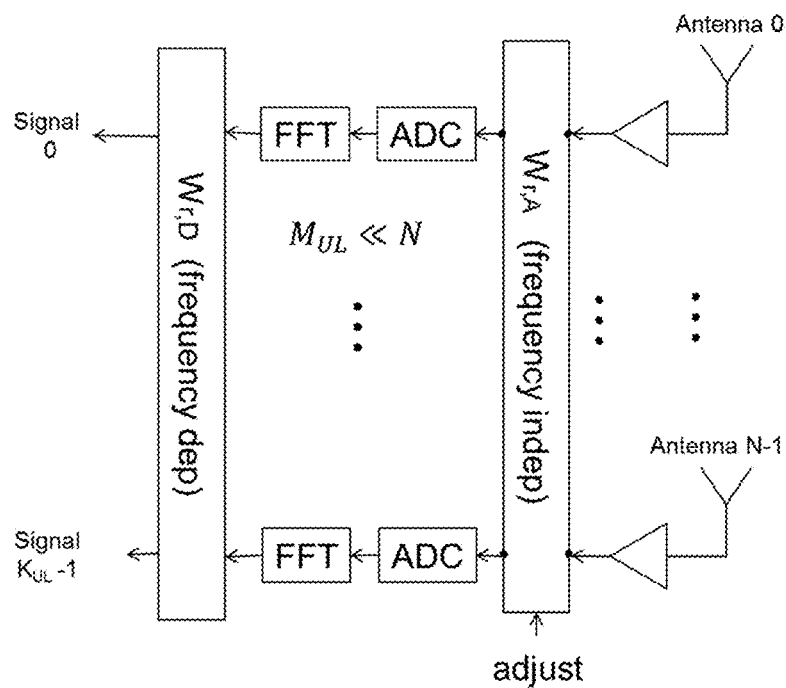
FIG. 9 is a diagram which shows an example of hybrid beam-forming in receiver side.

FIG. 8 is a diagram which shows an example of hybrid beam-forming at transmitter side, FIG. 9 is a diagram which shows an example of hybrid beam-forming at receiver side. In the hybrid beam-forming architecture as shown in FIG. 8, beams are formed using both digital and analog components. The $K_{DL}$ signals (which can be full bandwidth here, since each part of the signal can be transmitted in different directions) are first digitally precoded. Since this precoding is frequency dependent, the $K_{DL}$ can be split, and transmitted in different directions. In this case, port expansion occurs, so that the number of signals is increased, from $K_{DL}$ to $M_{DL}$. Still, it should be noted that $M_{DL}$ may be much less than N ($M_{DL} \ll N$).

A more natural realization of a hybrid beam-forming is that restrictions (for example, by using the phase shifters and adders) are put on the analog adjustments, so that the analog precoding is rarely adjusted. In this case, the adjustment is done only in the digital domain. In an extreme case, there is a fixed beam-forming structure (for example, including the phase shifters and adders) in the analog domain (i.e. a Butler matrix).

Turning to the hybrid receiving beam-forming solution shown in FIG. 9, the N antenna signals are combined to form $M_{UL}$ digital frequency domain signals, which are then spatially decoded, and forwarded (for example to the baseband).

In general, the digital beam-forming has great performance benefits by utilizing coherent reciprocity. Each channel of each antenna can be estimated. Also, there are no fundamental limitations on UL reception. There is no need of beam sweeping to receive the signal whose direction is not known.

However, the digital beam-forming solution is complex in general. Complexity means chip area/cost and power consumption, and in most cases these factors go hand in hand. The level of complexity in the digital domain is high, due to large high number of involved analog/digital converters (ADC and/or DAC) and IFFTs/FFTs. This complexity can probably be overcome, if the structure of the digital processing is redesigned.

One of the challenging parts is the converters, and in particular the AD converters. The complexity of a DAC/ADC is proportional to the sampling rate, and as the bandwidths of the signals increase, the problem can be alleviated significantly.

One of the main advantages of the analog beam-forming is that the level of complexity of the design is low. There are fewer DACs/ADCs, and fewer IFFTs/FFTs. Still, it is able to transmit to multiple users and receive from multiple users at the same time, due to the adders/splitters in the precoding structure.

A disadvantage of the analog beam-forming is that it is difficult to receive a signal with transmission direction. For example, for uplink reception, two or more beams may be received at the same time (or a small number of beams depending on the number of digital chains). The limitations in UL reception becomes more serious when non-scheduled transmissions are considered, such as PRACH (Physical Random Access Channel).

In this case, the network device (such as an eNodeB) does not know before-hand from which direction the transmission comes, and hence it cannot adjust the beam-forming with a narrow beam in the correct direction. To utilize an analog beam-forming to get the maximum array gain, a sweeping is needed for the analog beam direction, during which the UE repeatedly transmits its signal. If such sweeping is to be avoided, the coverage of such non-scheduled signals has to be increased in another way. Alternatively, the signal can be received in wide beams and integrated energy time.

Another disadvantage of the analog beam-forming is that there are losses in the analog components that do the beam shaping. It is very difficult to have flexible beam steering since channel is not explicitly known in the analog domain. For channels with a large angular spread, the analog beam-forming may be unable to capture all the richness in the channel, leading to a performance degradation relative to a fully digital solution with the adequate precoding functionality.

In this disclosure, a device including a transmitter and a receiver is provided. In the device, digital beam-forming is used in the receiver and analog beam-forming is used in the transmitter. It should be noted that the device may be the network device 101, or may be the terminal device 102, but it is not limited thereto.

First Aspect of Embodiments

A method for transmitting information is provided in one embodiment. The method is implemented at a device in which beam-forming is used and the device includes a receiver and a transmitter.

Figure 10:
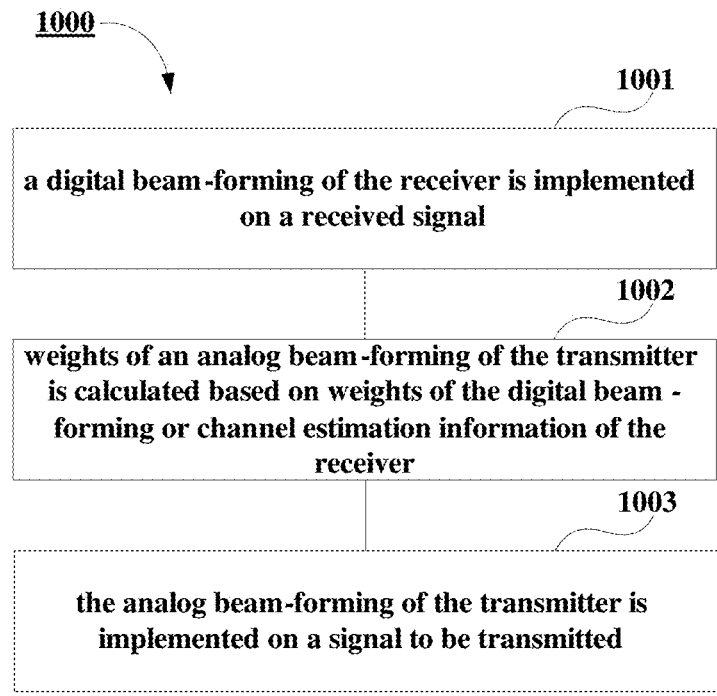
FIG. 10 shows a flowchart of transmitting information 1000 in accordance with an embodiment of the present disclosure.

FIG. 10 shows a flowchart of transmitting information 1000 in accordance with an embodiment of the present disclosure, and illustrates the method for transmitting information from a viewpoint of the device. As shown in FIG. 10, the method includes:

Block 1001, a digital beam-forming of the receiver is implemented on a received signal;

Block 1002, weights of an analog beam-forming of the transmitter is calculated based on weights of the digital beam-forming or channel estimation information of the receiver; and Block 1003, the analog beam-forming of the transmitter is implemented on a signal to be transmitted.

In this disclosure, channel reciprocity can be used to calculate the weights of an analog beam-forming of the transmitter based on weights of the digital beam-forming or channel estimation information of the receiver. However, it is not limited thereto, for example, the weights of the analog beam-forming of the transmitter may be determined by other ways or may be predetermined.

In one embodiment, RX channel can be obtained and used for TX beam-forming. There is no need for RX and TX beam sweeping. Furthermore, the level of complexity in the TX beam-forming (a large number of DAC) can also be lowered.

In one embodiment, for reception, any number of beams can be received at the same time. For transmission, the flexible beam shape can be generated since the channel can be obtained from uplink with reciprocity.

Figure 11:
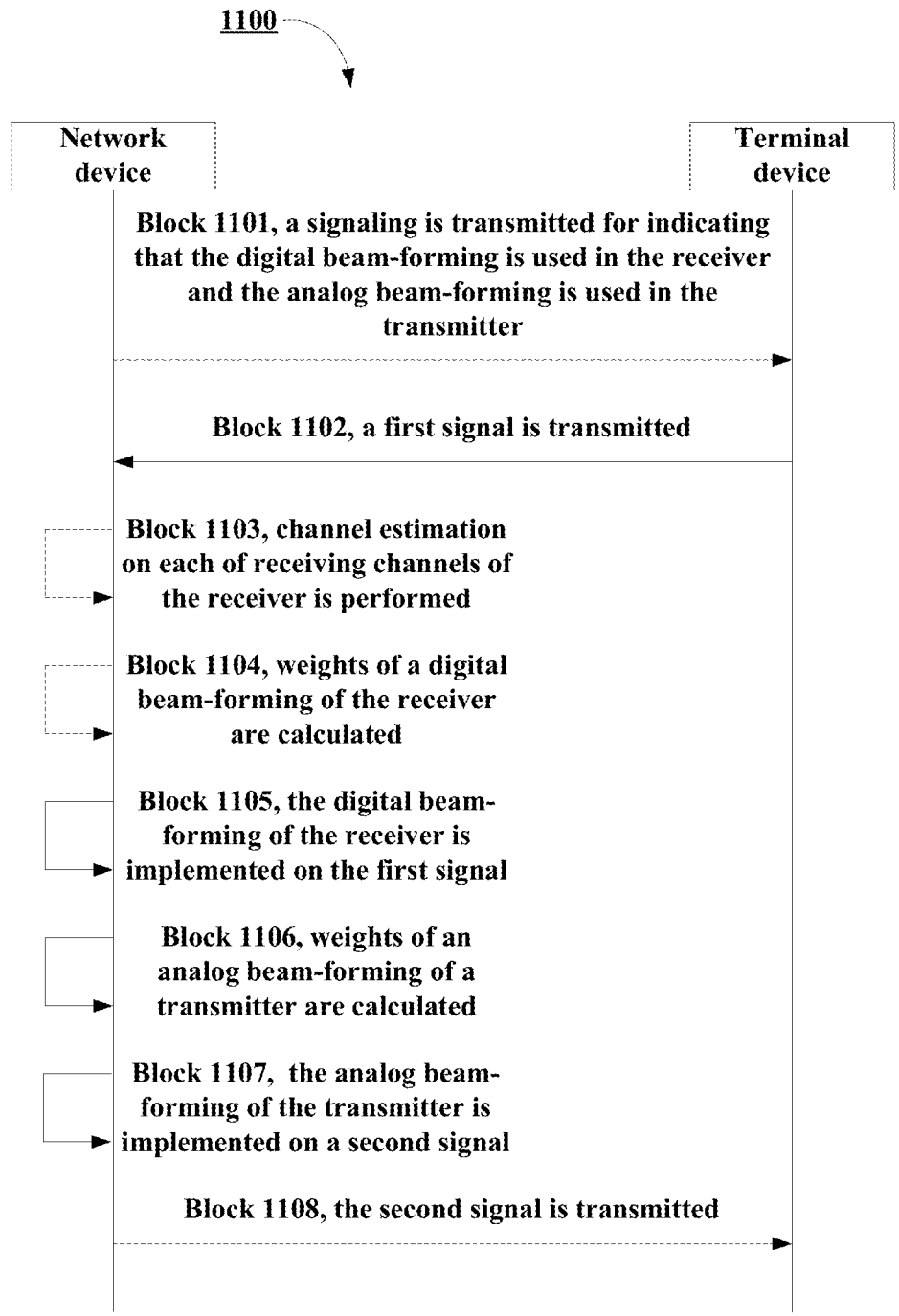
FIG. 11 shows another diagram of transmitting information 1100 in accordance with an embodiment of the present disclosure.

FIG. 11 shows another diagram of transmitting information in accordance with an embodiment of the present disclosure, and illustrates the method for transmitting information by taking a network device and a terminal device as an example. However, it is not limited thereto, for example the method of this disclosure may be implemented in a network device and/or a terminal device.

As shown in FIG. 11, the method includes:

Block 1101, optionally, a network device (such as a base station) transmits a signaling to a terminal device (such as a UE) for indicating that the digital beam-forming is used in the receiver and the analog beam-forming is used in the transmitter.

For example, when the method is applied at a base station, a signaling can be sent to the UE to inform the structure of the base station (that is, the digital beam-forming is used in the receiver and the analog beam-forming is used in the transmitter). Therefore, there is no need of RX beam sweep in the uplink.

Block 1102, the terminal device transmits a signal (a first signal) and the first signal is received by a receiver of the network device;

Block 1103, optionally, the network device performs channel estimation on each of receiving channels of the receiver based on the received signal (the first signal);

Block 1104, optionally, the network device calculates weights of a digital beam-forming of the receiver based on the channel estimation;

Block 1105, the network device implements the digital beam-forming of the receiver on the received signal (the first signal);

Block 1106, the network device calculates weights of an analog beam-forming of a transmitter based on weights of the digital beam-forming or channel estimation information of the receiver; and Block 1107, the network device implements the analog beam-forming of the transmitter on a signal to be transmitted (a second signal).

Block 1108, optionally, the network device transmits the signal (the second signal) by using the transmitter.

It should be noted that FIG. 11 is only an example of the disclosure, but it is not limited thereto. For example, the execution sequence (the method is applied at a UE as well) may be adjusted and/or some blocks may be omitted; moreover, some blocks not shown in FIG. 11 may be added.

In one embodiment, for reception, the device can receive the signal from any directions at the same time since digital beam-forming is used. For the non-scheduled transmissions, such as PRACH, the device (such as an eNodeB) does not know before-hand from which direction the transmission comes, and it can adjust the weights of the beam-forming ($W_{r,D}$) in digital domain.

For transmission, channel reciprocity may be used. For example, the base station may deem that situation of the downlink channel is similar to the situation of the uplink channel, so that the receiver weights $W_{r,D}$ can be used as the transmitter weights $W_{t,A}$.

In the other way, the receiving channel is estimated at the receiver. Thanks to the reciprocity, the receiving channel can be used as transmitting channel. With the estimated channel, the transmitter weights ($W_{t,A}$) can be calculated. The transmitter weights ($W_{t,A}$) are applied in analog domain.

In one embodiment, to obtain the receiving channel or the receiver weights $W_{r,D}$, a sounding reference signal may also be used. It is to be understood that, the above examples or embodiments are discussed for illustration, rather than limitation. Those skilled in the art would appreciate that there may be many other embodiments or examples.

In one embodiment, in order to achieve phase/amplitude alignment among antenna ports, antenna calibration of the transmitter and/or receiver can be implemented.

Figure 12:
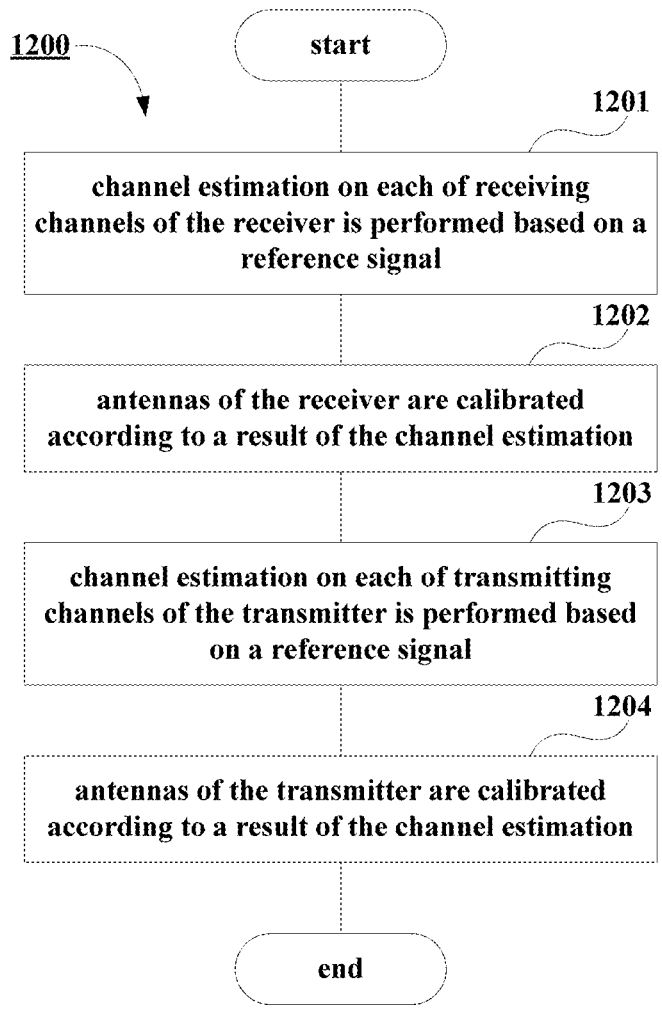
FIG. 12 shows a diagram of calibrating 1200 in accordance with an embodiment of the present disclosure.

FIG. 12 shows a diagram of calibrating in accordance with an embodiment of the present disclosure. As shown in FIG. 12, the method includes:

Block 1201, channel estimation on each of receiving channels of the receiver is performed based on a reference signal;

Block 1202, antennas of the receiver are calibrated according to a result of the channel estimation.

As shown in FIG. 12, optionally, the method may further include:

Block 1203, channel estimation on each of transmitting channels of the transmitter is performed based on a reference signal;

Block 1204, antennas of the transmitter are calibrated according to a result of the channel estimation.

It should be noted that FIG. 12 shows only an example of the disclosure, but it is not limited thereto. For example, the execution sequence may be adjusted and/or some blocks may be omitted; moreover, some blocks not shown in FIG. 12 may be added.

For example, only blocks 1201 and 1202 are executed in a case; or only blocks 1203 and 1204 are executed in another case. Moreover, the reference signal for transmitter calibration may be different from the reference signal for receiver calibration in a case; or the reference signal for transmitter calibration may be same as the reference signal for receiver calibration in another case.

In one embodiment, all the channels may be calibrated to have the same phase. For the reception, it is digital beam-forming and traditional digital antenna calibration can be applied. For the transmission, it is analog beam-beamforming, and traditional analog antenna calibration can be applied.

Also, it should be noted that considering analog beam-forming actuator position is between PA and filter before antenna, there isn't phase sensitive component in the area. It is possible that real-time antenna calibration isn't needed. A pre-calibration for example, production test, could be used in transmitting phase alignment. That means only real-time receiving antenna calibration is needed.

In this disclosure, Kr digital chains are in the receiver and Kt digital chains are in the transmitter; where Kt is less than Kr.

In one embodiment, it can be extended to hybrid beam-forming at receiver side and/or transmitter side. The number of digital chains at the receiver side can be different from the number of digital chains at the transmitter side. In most cases, the number of digital chains at the receiver side is greater than that at the transmitter side.

In one embodiment, the calibration in the hybrid structure of the present disclosure is the same as what is performed as the calibration in digital and analog beam-forming respectively, so the reciprocity can be applied (or used) with this structure. The phase of the branches in the uplink/downlink is calibrated to the same.

It is to be understood that, the above examples or embodiments are discussed for illustration, rather than limitation. Those skilled in the art would appreciate that there may be many other embodiments or examples within the scope of the present disclosure.

As can be seen from the above embodiment, the digital beam-forming is used for receiving and there is no need to know which direction the transmission comes from; the analog beam-forming is used for transmitting and the transmitter beam weights can be derived from the receiving channels. Therefore, not only no beam sweeping is needed, but also complexity of the transmitter is lowered and flexible beam can be used.

Second Aspect of Embodiments

An apparatus for transmitting information is provided in one embodiment. The apparatus may be configured in the network device 101 or the terminal device 102 in which beam-forming is used, and the same contents as those in the first aspect of embodiments are omitted.

Figure 13:
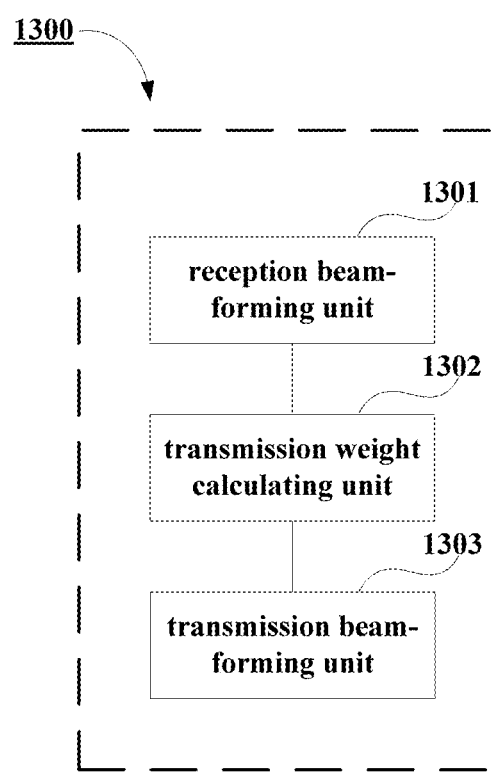
FIG. 13 shows a block diagram of an apparatus 1300 for transmitting information in accordance with an embodiment of the present disclosure.

FIG. 13 shows a block diagram of an apparatus 1300 for transmitting information in accordance with an embodiment of the present disclosure. As shown in FIG. 13, the apparatus includes:

a reception beam-forming unit 1301 configured to implement a digital beam-forming of a receiver on a received signal;

a transmission weight calculating unit 1302 configured to calculate weights of an analog beam-forming of a transmitter based on weights of the digital beam-forming or channel estimation information of the receiver; and a transmission beam-forming unit 1303 configured to implement the analog beam-forming of the transmitter on a signal to be transmitted.

In this disclosure, the transmission weight calculating unit 1302 may be configured to calculate the weights of an analog beam-forming of the transmitter based on weights of the digital beam-forming or channel estimation information of the receiver by using channel reciprocity.

Figure 14:
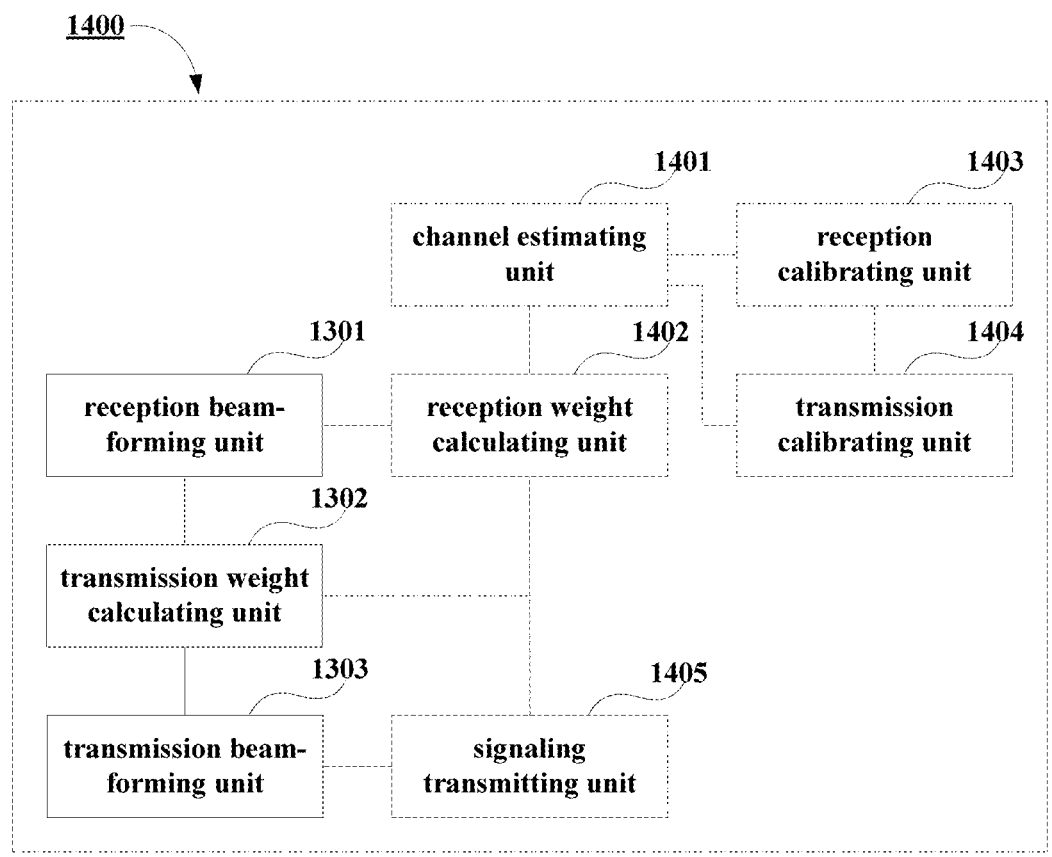
FIG. 14 shows a block diagram of another apparatus 1400 for transmitting information in accordance with an embodiment of the present disclosure.

FIG. 14 shows a block diagram of another apparatus 1400 for transmitting information in accordance with an embodiment of the present disclosure. As shown in FIG. 14, the apparatus 1400 includes: the reception beam-forming unit 1301, the transmission weight calculating unit 1302 and the transmission beam-forming unit 1303, as illustrated in the above.

As shown in FIG. 14, the apparatus 1400 may further include:

a channel estimating unit 1401 configured to perform channel estimation on each of receiving channels of the receiver based on the received signal; and a reception weight calculating unit 1402 configured to calculate the weights of the digital beam-forming of the receiver based on the channel estimation.

In one embodiment, Kr digital chains are in the receiver and Kt digital chains are in the transmitter; where Kt is less than Kr.

Figure 15:
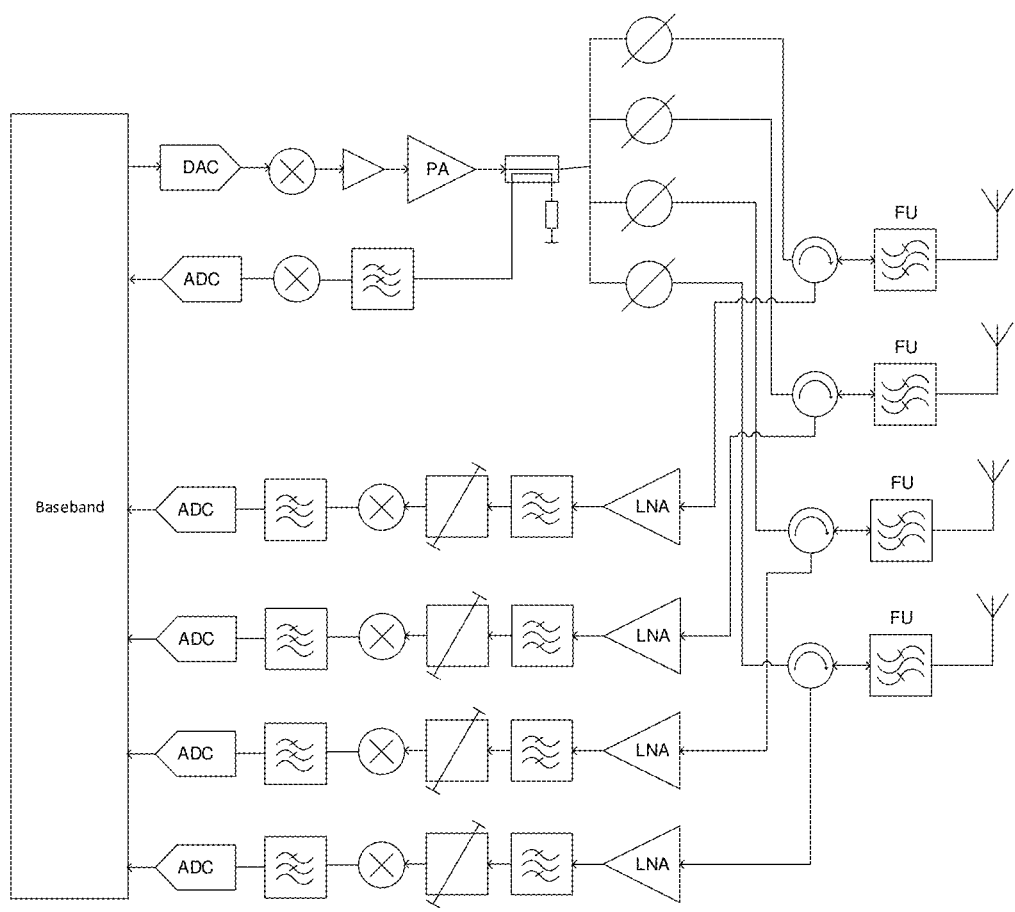
FIG. 15 shows an example of transceiver architecture in accordance with an embodiment of the present disclosure.

FIG. 15 shows an example of transceiver architecture in accordance with an embodiment of the present disclosure. As shown in FIG. 15, a typical transceiver architecture for the solution is demonstrated. It should be noted that only 4-branch transceiver is shown in FIG. 15, but the architecture can be extended to multi-branch, for example, 64-branch or higher.

In one embodiment, actuators for transmitting analog beam-forming can be allocated after power transistors (or may be referred as to PA). The purpose is to save high power transistor costs and solve the thermal issues caused.

As shown in FIG. 15, for receiving, because of digital beam-forming utilization, 4 complete receiver chains (digital chains) are needed. While for transmitting, only 1 transmitter chain (analog chain) is needed.

Figure 16:
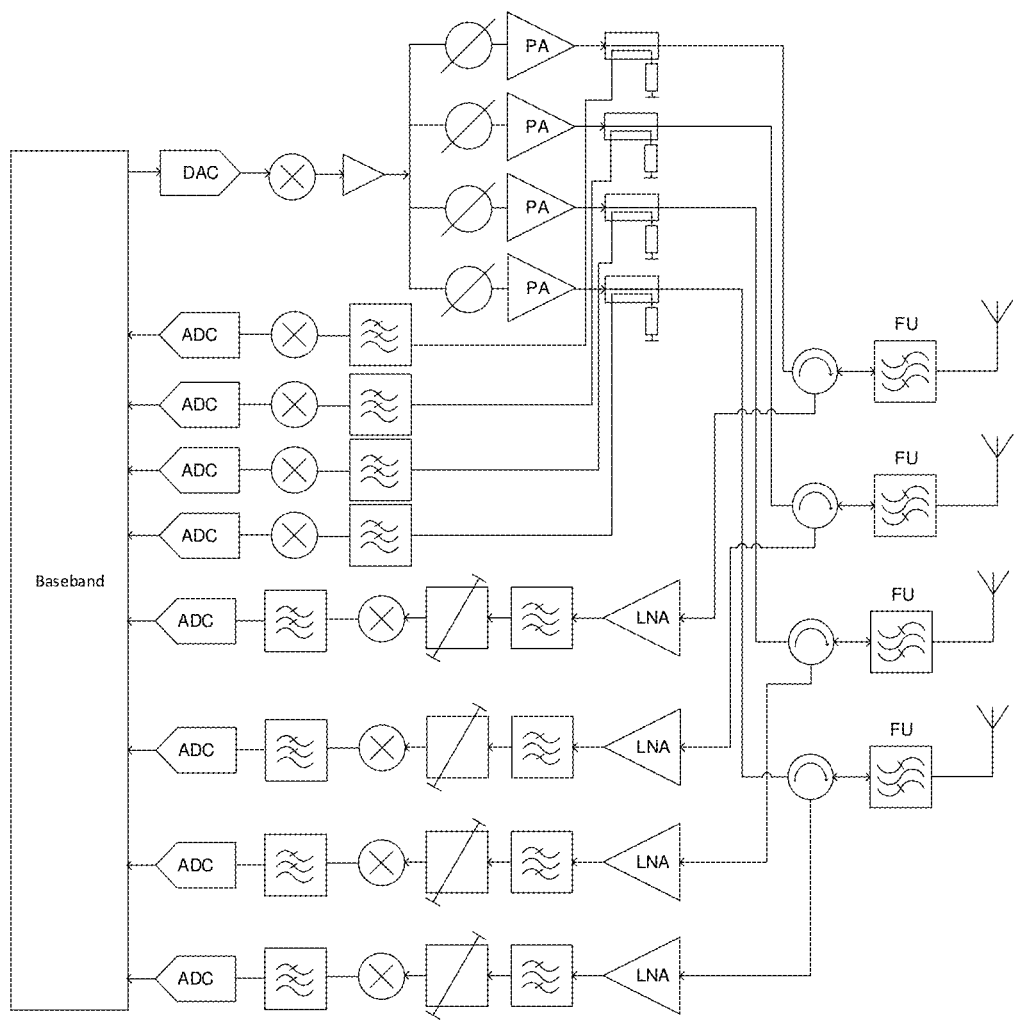
FIG. 16 shows another example of transceiver architecture in accordance with an embodiment of the present disclosure.

FIG. 16 shows another example of transceiver architecture in accordance with an embodiment of the present disclosure. As shown in FIG. 16, an alternative transceiver architecture is depicted also, where the difference is actuators are allocated before power transistors, subsequently, observation receiver for DPD (Digital Pre-Distortion) per power transistor branch is needed. In some application scenarios, the structure of FIG. 16 can bring higher output power, compared with the structure of FIG. 15.

In this disclosure, not limited in FIG. 15 and FIG. 16, more transceiver architectures could be adapted and suitable for the solution. Balance among hardware cost, size, output power, power efficiency and implementation complexity need to be considered.

In order to achieve phase/amplitude alignment among antenna ports, antenna calibration of the transmitter and/or receiver can be implemented.

In one embodiment, the channel estimating unit 1401 may further be configured to perform channel estimation on each of receiving channels of the receiver based on a reference signal;

As shown in FIG. 14, the apparatus 1400 may further include:

a reception calibrating unit 1403 configured to calibrate antennas of the receiver according to a result of the channel estimation.

In one embodiment, the channel estimating unit 1401 may further be configured to perform channel estimation on each of transmitting channels of the transmitter based on a reference signal.

As shown in FIG. 14, the apparatus 1400 may further include:

a transmission calibrating unit 1404 configured to calibrate antennas of the transmitter according to a result of the channel estimation.

Figure 17:
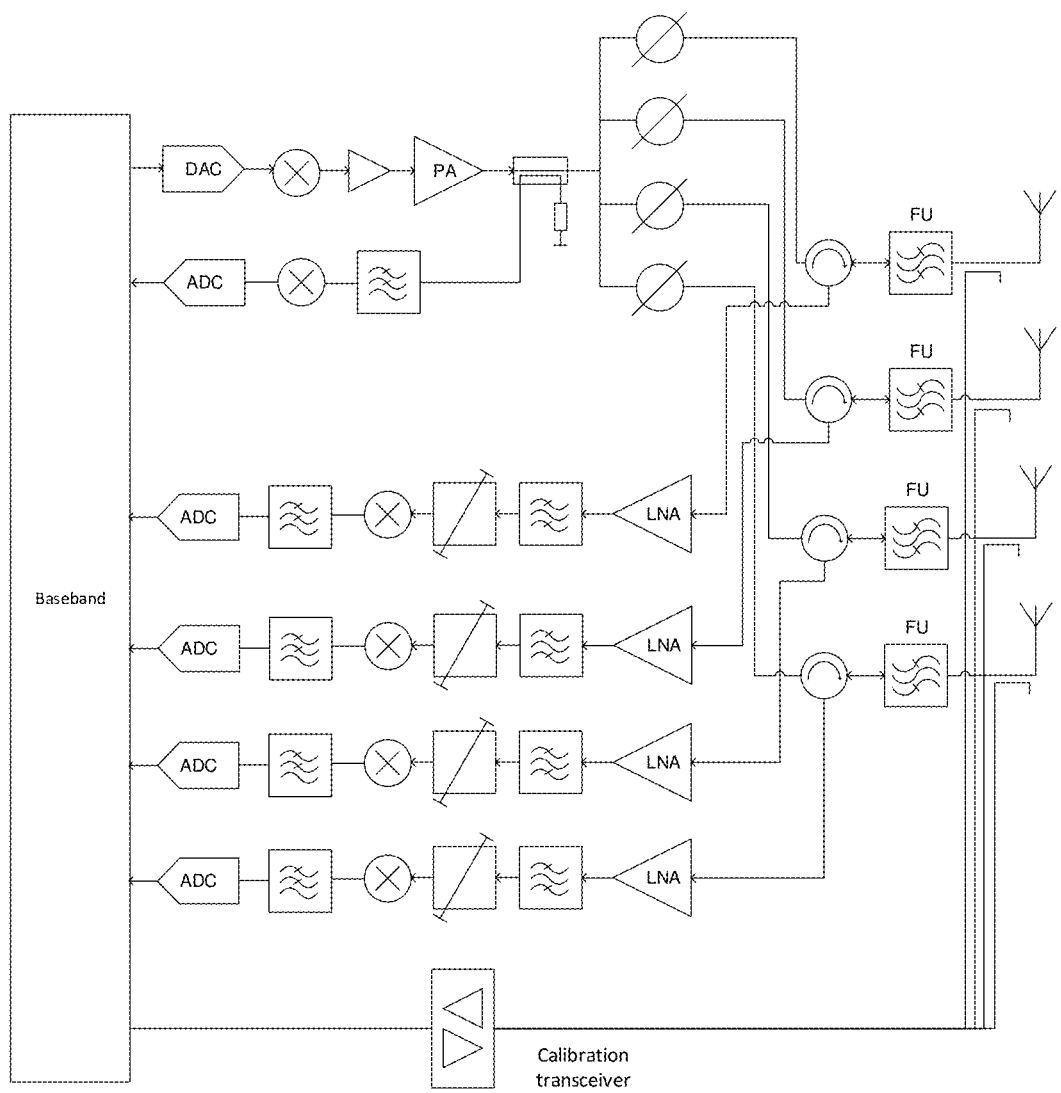
FIG. 17 shows an example of transceiver architecture with calibration in accordance with an embodiment of the present disclosure.

FIG. 17 shows an example of transceiver architecture with calibration in accordance with an embodiment of the present disclosure. As shown in FIG. 17, the antenna calibration method/unit suitable for the structure is depicted. The antenna calibration still can use a conventional implementation.

It should be noted that antenna calibration for the proposed architecture isn't limited to the above implementations, it could be UE assisted or over-the-air calibration. FIG. 17 is only an example of this disclosure. Furthermore, it is to be understood that, the above examples or embodiments are discussed for illustration, rather than limitation. Those skilled in the art would appreciate that there may be many other embodiments or examples within the scope of the present disclosure.

For example, FIGS. 15 to 17 only show a part of components about transmitting and receiving, but it is not limited thereto, other parts of components (such as some modules/units for digital signal processing) are omitted for simplicity.

In one embodiment, as shown in FIG. 14, the apparatus 1400 may further include: a signaling transmitting unit 1405 configured to transmit a signaling to another device for indicating that the digital beam-forming is used at receiver and the analog beam-forming is used at transmitter.

It should be appreciated that components included in the apparatus 1300 and/or 1400 correspond to the operations of the methods 1000, 1100 and 1200. Therefore, all operations and features described above with reference to FIGS. 10, 11 and 12 are likewise applicable to the components included in the apparatus 1300 and/or 1400 and have similar effects. For the purpose of simplification, the details will be omitted.

It should be noted that the components included in the apparatuses 1300 and/or 1400 may be implemented in various manners, including software, hardware, firmware, or any combination thereof.

In one embodiment, one or more units may be implemented using software and/or firmware, for example, machine-executable instructions stored on the storage medium. In addition to or instead of machine-executable instructions, parts or all of the components included in the apparatuses 1300 and/or 1400 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1300 or 1400 may be a part of a device. But it is not limited thereto, for example, the apparatus 1300 or 1400 may be the network device 101 or the terminal device 102, other parts of the network device 101 or the terminal device 102, such as transmitter and receiver, are omitted in the FIGS. 13 and 14.

As can be seen from the above embodiment, the digital beam-forming is used for receiving and there is no need to know which direction the transmission comes from; the analog beam-forming is used for transmitting and the transmitter beam weights can be derived from the receiving channels. Therefore, not only no beam sweeping is needed, but also complexity of the transmitter is lowered and flexible beam can be used.

Third Aspect of Embodiments

A device (such as a terminal device or a network device) is provided in one embodiment, and the same contents as those in the first aspect and the second aspect of embodiments are omitted.

Figure 18:
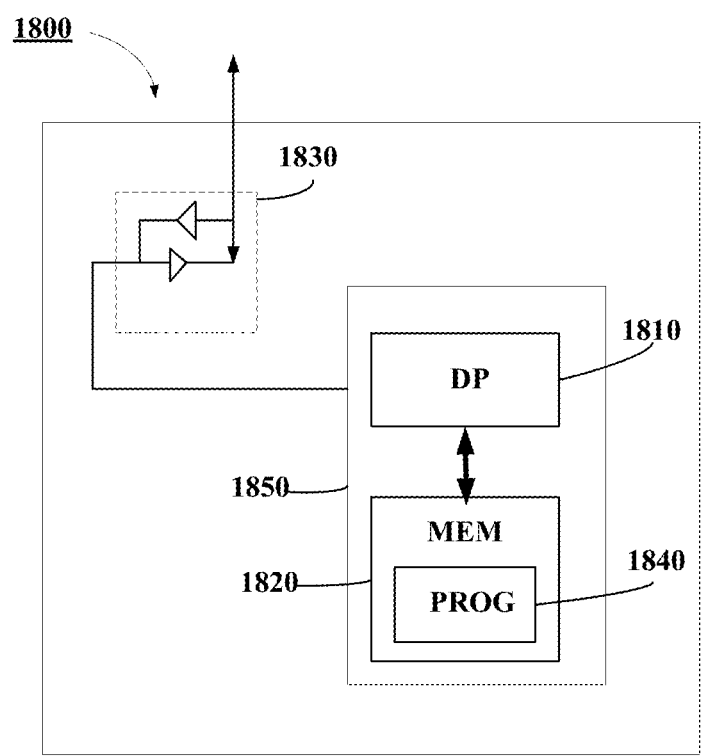
FIG. 18 shows a simplified block diagram of a device 1800 that is suitable for implementing embodiments of the present disclosure.

FIG. 18 shows a simplified block diagram of a device 1800 that is suitable for implementing embodiments of the present disclosure. It would be appreciated that the device 1800 may be implemented as at least a part of, for example, the network device 101 or the terminal device 102.

As shown, the device 1800 includes a communicating means 1830 and a processing means 1850. The processing means 1850 includes a data processor (DP) 1810, a memory (MEM) 1820 coupled to the DP 1810. The communicating means 1830 is coupled to the DP 1810 in the processing means 1850. The MEM 1820 stores a program (PROG) 1840. The communicating means 1830 is for communications with other devices, which may be implemented as a transceiver for transmitting/receiving signals.

In some embodiments where the device 1800 acts as a network device, the processing means 1850 may be configured to generate an indication, and the communicating means 1830 may be configured to transmit the indication in association with a system signature. In some other embodiments where the device 1800 acts as a terminal device, the processing means 1850 may be configured to detect, in response to detecting a system signature and an indication, and the communicating means 1830 may be configured to receive the indication.

For example, the memory 1820 stores a plurality of instructions; and the processor 1810 coupled to the memory 1820 and configured to execute the instructions to: implementing a digital beam-forming of the receiver on a received signal; calculating weights of an analog beam-forming of the transmitter based on weights of the digital beam-forming or channel estimation information of the receiver; and implementing the analog beam-forming of the transmitter on a signal to be transmitted.

The PROG 1840 is assumed to include program instructions that, when executed by the associated DP 1810, enable the device 1800 to operate in accordance with the embodiments of the present disclosure, as discussed herein with the method 1000, 1100 or 1200. The embodiments herein may be implemented by computer software executable by the DP 1810 of the device 1800, or by hardware, or by a combination of software and hardware. A combination of the data processor 1810 and MEM 1820 may form processing means 1850 adapted to implement various embodiments of the present disclosure.

The MEM 1820 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1800, there may be several physically distinct memory modules in the device 1800. The DP 1810 may be of any type suitable to the local technical environment, and may include one or more of general purpose computers, special purpose computers, microprocessors, digital signal processors (DSPs) and processors based on multicore processor architecture, as non-limiting examples. The device 1800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method at a device in which beam-forming is to be used and the device comprises a receiver and a transmitter, the method comprising:
    implementing a digital beam-forming of the receiver on a received signal, without use of beam sweeping and without use of analog-beamforming, to determine direction of the received signal;
    calculating weights of the digital beam-forming based on the received signal;
    calculating, using channel reciprocity, weights of an analog beam-forming of the transmitter based on the weights of the digital beam-forming; and
    implementing the analog beam-forming in an analog stage of the transmitter, based on the calculated weights of the analog beam-forming, on a signal to be transmitted,
    wherein the implementing the analog beam-forming in the analog stage of the transmitter requires one digital path and one or more analog paths, the one or more analog paths for applying the calculated weights of the analog beam-forming, and
    wherein the transmitter transmits the signal without use of beam sweeping and without use of digital beam-forming to transmit.

2. The method according to claim 1, wherein the implementing the analog beam-forming further comprises:
    allocating the analog beam-forming prior to a power amplifier stage of the transmitter.

3. The method according to claim 1, wherein the implementing the analog beam-forming further comprises:
    allocating the analog beam-forming after a power amplifier stage of the transmitter.

4. The method according to claim 1, wherein the method further comprising calibrating antennas of the transmitter according to the analog beam-forming, and wherein all channels of the antennas are calibrated to have a same phase.

5. An apparatus, in which beam-forming is to be used, the apparatus comprising:
    a receiver;
    a processor; and
    a storage medium containing instructions which, when executed on the processor, cause the apparatus to:
        implement a digital beam-forming of the receiver on a received signal, without use of beam sweeping and without use of analog-beamforming, to determine direction of the received signal;
        calculate weights of the digital beam-forming based on the received signal;
        calculate, using channel reciprocity, weights of an analog beam-forming of a transmitter based on the weights of the digital beam-forming; and
        implement the analog beam-forming in an analog stage of the transmitter, based on the calculated weights of the analog beam-forming, on a signal to be transmitted,
    wherein the implementation of the analog beam-forming in the analog stage of the transmitter requires one digital path and one or more analog paths, the one or more analog paths for applying the calculated weights of the analog beam-forming, and wherein the transmitter transmits the signal without use of beam sweeping and without use of digital beam-forming to transmit.

6. The apparatus according to claim 5, wherein the instructions further cause the apparatus to:
allocate the analog beam-forming prior to a power amplifier stage of the transmitter.

7. The apparatus according to claim 5, wherein the instructions further cause the apparatus to:
allocate the analog beam-forming after a power amplifier stage of the transmitter.

8. The apparatus according to claim 5, wherein the instructions further cause the apparatus to calibrate antennas of the transmitter according to the analog beam-forming, and wherein all channels of the antennas are calibrated to have a same phase.

9. A device, in which beam-forming is to be used, the device comprising:
a receiver;
a transmitter;
a processor; and
a storage medium containing instructions which, when executed on the processor, cause the device to:
implement a digital beam-forming of the receiver on a received signal, without use of beam sweeping and without use of analog-beamforming, to determine direction of the received signal;
calculate weights of the digital beam-forming based on the received signal;
calculate, using channel reciprocity, weights of an analog beam-forming of the transmitter based on the weights of the digital beam-forming; and
implement the analog beam-forming in an analog stage of the transmitter, based on the calculated weights of the analog beam-forming, on a signal to be transmitted,
wherein the implementation of the analog beam-forming in the analog stage of the transmitter requires one digital path and one or more analog paths, the one or more analog paths for applying the calculated weights of the analog beam-forming, and
wherein the transmitter transmits the signal without use of beam sweeping and without use of digital-beamforming to transmit.

10. A non-transitory machine-readable storage medium containing instructions which, when executed on a processor of a device comprising a transmitter, cause the device to perform operations comprising:
implementing a digital beam-forming on a received signal, without use of beam sweeping and without use of analog-beamforming, to determine direction of the received signal;
calculating weights of the digital beam-forming based on the received signal;
calculating, using channel reciprocity, weights of an analog beam-forming of the transmitter based on the weights of the digital beam-forming; and
implementing the analog beam-forming in an analog stage of the transmitter, based on the calculated weights of the analog beam-forming, on a signal to be transmitted,
wherein the implementing the analog beam-forming in the analog stage of the transmitter requires one digital path and one or more analog paths, the one or more analog paths for applying the calculated weights of the analog beam-forming, and
wherein the transmitter transmits the signal without use of beam sweeping and without use of digital-beamforming to transmit.

11. The non-transitory machine-readable storage medium according to claim 10, wherein the instructions cause the device to further perform operations comprising:
allocating the analog beam-forming prior to a power amplifier stage of the transmitter.

12. The non-transitory machine-readable storage medium according to claim 10, wherein the instructions cause the device to further perform operations comprising:
allocating the analog beam-forming after a power amplifier stage of the transmitter.

13. The non-transitory machine-readable storage medium according to claim 10, wherein the instructions cause the device to further perform operations comprising calibrating antennas of the transmitter according to the analog beam-forming, and wherein all channels of the antennas are calibrated to have a same phase.

* * * * *